Patented Sept. 17, 1946

2,407,689

UNITED STATES PATENT OFFICE 2,407,689

CHEMICAL PROCESS AND PRODUCT

Frank J. Soday, Baton Rouge, La., assignor to The United Gas Improvement Company, a corporation of Pennsylvania No Drawing. Application February 12, 1944, Serial No. 522,093

10 Claims. (Cl. 106—178)

This invention pertains to new compositions of matter and to methods for their preparation.

More particularly, this invention pertains to indene-type haloesters, and to processes for the preparation of these new derivatives.

This invention is based upon the discovery that indene-type halo-esters having the structural formula

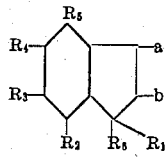

in which any R represents hydrogen, alkyl such as methyl, ethyl, propyl, butyl, amyl, and the like; aryl such as phenyl; alkyl-aryl such as tolyl, xylyl, and the like; or aryl-alkyl such as methyl phenyl groups, one of the group consisting of $a$ and $b$ is a halo group, such as chlorine or bromine, the remaining group being an OOCR group, in which R has the same meaning as before may be obtained in good yields from indene and/or substituted indenes.

It is an object of the present invention to provide as new compositions of matter indene type haloesters and methods for their preparation and purification. Another object of the invention is the provision of compounds having unusually desirable properties when used as plasticizing agents for synthetic plastics and/or rubbers. Still another object of the invention is the provision of new compounds which may be used as intermediates in chemical syntheses. Other objects and advantages of the invention will be apparent to those skilled in the art upon an inspection of the specification and claims.

The indene-type compounds employed in the preparation of these new compounds may be in the form of pure or commercially or technically pure indene or substituted indene, or in the form of a solution or fraction of any desired concentration. Of the substituted indenes, mono-substituted indene is frequently preferred. Likewise alkyl substituted indene is frequently preferred, such as when the alkyl group or groups contain less than six carbon atoms.

The term "indene-type compound" as used in the specification is intended to designate indene and substituted indene compounds.

These indene-type compounds may be obtained by the distillation of so-called "light oil" from oil gas, carburetted water gas, cracked refinery gases, or coal gas, as well as from other sources. "Light oil" comprises the oily condensates and/or distillate from tar condensates obtained during the manufacture of hydrocarbon-containing gas by methods which may involve the pyrolytic decomposition of hydrocarbon oil, with or without the aid of catalysts. Such fractions will be referred to herein, generally, as light oil indene-type fractions. The fractions obtained in the manufacture of oil gas are particularly suitable.

Indene fractions obtained by the distillation of light oil and boiling mainly between 175 and 190° C., and more particularly between 178 and 185° C. have been satisfactorily employed for the production of these new compounds.

A preferred type of substituted indene-type compound to be used in the practice of my invention is the alkyl indene hydrocarbons, and more particularly the methyl indene hydrocarbons. Light oil fractions boiling mainly between 190 and 220° C., which fractions may be further subdivided into fractions boiling mainly in the ranges of (a) 190 to 200° C., (b) 200 to 210° C., or 210 to 220° C., are particularly desirable starting materials for the preparation of indene-type haloesters.

Instead of relatively pure fractions containing a particular indene-type compound, fractions containing two or more indene-type compounds may be employed in the process. For example, a fraction obtained by the distillation of light oil from oil gas, and containing both indene and one or more methyl indenes, and perhaps higher alkylated indenes, may be used in the process with excellent results. The mixed derivatives thus obtained may be used as such, or they may be separated by any desired method, such as by fractionation or by azeotropic distillation.

I have discovered that the haloesters derived from light oil indene-type fractions possess unusually desirable properties. This is due to the unusually stable nature of the halogen group, particularly when the halogen group is chlorine, in the said compounds, rendering them suitable for use as plasticizing agents for a large variety of polymeric and/or plastic materials.

I have discovered further that indene-type halohydrines may be prepared by the action of a hypohalous acid, or a compound capable of generating hypohalous acid in situ, in the presence of one or more organic acids and/or anhydrides, upon an indene-type hydrocarbon, or by the reaction of one or more organic acids and/or anhydrides with an indene-type halohydrine.

The initial step in one method of preparation of indene-type halohydrines, or mixtures containing indene-type halohydrines, comprises contacting the desired indene-type hydrocarbon, or mixture containing at least one indene-type hydrocarbon, with a hypohalous acid, or with a substance capable of generating hypohalous acid in situ, in admixture with the desired organic acid and/or anhydride.

Typical organic acids which may be employed in the preparation of indene haloesters include normal fatty acids, such as formic, acetic, propionic, butyric, valeric, caproic, oenanthic, caprylic, pelargonic, capric, undecoic, lauric tridecoic, myristic, palmitic, margeric, stearic, and similar acids having a higher number of carbon atoms; substituted fatty acids such as isobutyric, isovaleric, active valeric, trimethyl acetic, isocaproic, methyl n-propyl acetic, diethyl acetic, sec. butyl acetic, dimethyl ethyl acetic, tert. butyl acetic, methyl isopropyl acetic, and similar acids; unsaturated acids, such as acrylic acid, methacrylic acid, crotonic acid, isocrotonic acid, vinyl acetic acid, and the like; halogenated fatty acids, such as chloroformic acid; monochloroacetic acid, dichloroacetic acid, a-chloropropionic acid, and the like; hydroxy acids, such as glycollic acid, lactic acid, a-hydroxy-butyric acid, and the like; amino acids, such as glycine, alanine, valine, leucine, and the like; dibasic acids, such as oxalic acid, malonic acid, methyl malonic acid, succinic acid, maleic acid, fumaric acid, and the like; aromatic carboxylic acids, such as benzoic acid, anthranilic acid, salicyclic acid, phthalic acid, and the like; and aryl-substituted aliphatic acids, such as phenyl acetic acid, hydrocinnamic acid, phenyl propionic acid, and cinnamic acid.

The use of aliphatic fatty acids for example, those of less than six carbon atoms, is preferred. Excellent results are obtained by the use of acetic acid.

In general, the use of concentrated acids, such as, above 80% and/or the corresponding anhydride, is preferred. Thus, in the case of acetic acid, the use of the so-called glacial acetic acid is preferred.

The methods which have been developed for the preparation of haloesters from indene will serve to illustrate the preparation of indene-type haloesters in general.

Indene-type haloesters are formed when the desired indene-type hydrocarbon is contacted with aqueous solutions of hypochlorous acid and concentrated acetic acid, for example, at normal or reduced temperatures. Conditions which promote intimate contact of the phases accelerate the formation of the desired haloester.

The hypochlorous acid used in the reaction may be obtained in various ways, such as by the use of chlorine, sodium hypochlorite, or calcium hypochlorite as starting materials.

Numerous methods have been devised for the preparation of hypochlorous acid from chlorine. Chief among these is the reaction of chlorine with water according to the following equation.

$$H_2O + Cl_2 = HOCl + HCl$$

Although the proportions of hypochlorous and hydrochloric acids actually present under normal operating conditions are quite small, the velocity of the reaction between the hypochlorous acid and the indene-type hydrocarbon is so much greater than that between chlorine, or hydrochloric acid, and the indene-type hydrocarbon, that it is possible to obtain good yields of the desired chlorohydrine, and hence of the desired chloroester.

As the reaction is usually carried out, chlorine and the indene-type hydrocarbon are separately passed into a suitable vessel containing a concentrated solution of the desired acid. The solution is thoroughly agitated throughout the course of the reaction.

Apparently the most important reaction variable is the degree of agitation of the reaction mixture throughout the course of the reaction. Thorough agitation appears to be practically essential for good yields. The use of a turbo-mixing type of agitator has been found to be a very satisfactory method for securing a satisfactory degree of agitation of the reaction mixture. The turbo-mixing unit employed may consist of a multiple-blade agitator revolving within a concentric ring supporting numerous vanes, which serves to further subdivide the liquid currents set up by the agitator blades. It is advisable to introduce the chlorine and indene-type hydrocarbon reactants in the form of streams immediatedly underneath the agitator blades in order to secure an intimate contact between the reactants in the liquid phase.

Other methods of agitation which may be employed are the introduction of the reactants into the reaction vessel through fine orifices under pressure, as well as the use of certain inert gases (e. g., nitrogen or carbon dioxide) for agitating the reaction mass. An alternative method comprises introducing the reactants into a centrifugal pump operating at a relatively high speed.

The temperature employed in the reaction may be varied over considerable limits, although temperatures above 80° C. are rarely employed. Excellent results are secured by the use of temperatures in the range of 5 to 40° C.

Catalysts such as aqueous solutions of copper chloride or ferric chloride may be employed if desired, although excellent yields may be obtained in the absence of catalysts.

Other methods which have been developed for the preparation of hypochlorous acid from chlorine include the following.

1. The reaction of chlorine with water in the presence of mercuric oxide.

2. The preparation of chlorine oxide from chlorine, followed by the reaction of the chlorine oxide with water to form an aqueous solution of hypochlorous acid.

3. Passing chlorine into an aqueous solution of sodium carbonate and sodium bicarbonate.

4. Passing chlorine into an aqueous alkaline solution.

5. Passing chlorine into an aqueous alkaline solution of a metallic hypochlorite.

6. Passing chlorine into water in the presence of a material capable of neutralizing the hydrochloric acid formed, such as disodium hydrogen phosphate.

In all cases, the hypochlorous acid so obtained then may be reacted with an indene-type hydrocarbon in the presence of an organic acid to form the desired haloester. In many cases, the two reactions involved may be carried out simultaneously.

Methods which have been developed for the preparation of hypochlorous acid solutions from an alkali metal hypohalite, such as sodium hypochlorite, include the following.

1. The reaction of sodium hypochlorite with a weak acid, such as boric acid.

2. The reaction of an alkaline solution of sodium hypochlorite with sodium bicarbonate.

3. The reaction of sodium hypochlorite with chlorine in the presence of water.

Methods which have been developed for the preparation of hypochlorous acid solutions from an alkaline earth metal hypohalite, such as calcium hypochlorite, include the following.

1. The action of weak acids, such as carbon dioxide, upon an aqueous solution of calcium hypochlorite.

2. The reaction of chlorine with a dilute aqueous solution of calcium hypochlorite in the presence of an alkali, such as sodium hydroxide.

As mentioned previously, the hypohalous acid thus obtained may be reacted with an indene-type hydrocarbon in the presence of an organic acid to form the desired haloester. The reactions may be carried out simultaneously. Thus, a mixture of calcium hypochlorite and acetic acid may be reacted with the indene-type hydrocarbon.

Various modifications of these methods also may be employed for the production of indene-type haloesters. For example, the desired indene-type hydrocarbon, the organic acid, and chlorine may be alternately passed into an aqueous solution of cupric chloride with good agitation, the time interval between successive additions being relatively short.

The reaction may be carried out in any desired manner, such as batch, multiple batch, batch countercurrent, or continuous countercurrent methods. The reaction may be carried out in a plurality of reaction vessels, if desired, or it may be carried out in one or more towers, which may be packed with any suitable material, or which may be provided with baffles, bubble trays, or other devices to insure thorough mixing of the reactants.

The reaction may be carried out at atmospheric, subatmospheric, or superatmospheric pressures. Excellent results are obtained by conducting the reaction at atmospheric pressure.

Other desirable methods for the preparation of indene-type haloesters include the reaction of the desired indene-type hydrocarbon with certain compounds capable of generating hypohalous acid in situ. Examples of such compounds are tertiary butyl hypochlorite and monochlorourea.

Tertiary butyl hypochlorite

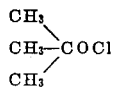

reacts with indene-type hydrocarbons in the presence of an organic acid to form the corresponding haloester. A by-product of the reaction is tertiary butyl alcohol, which may be separated from the reaction product by suitable means, such as by fractional distillation, and reused in the process. Tertiary butyl alcohol may therefore be regarded as a carrier for hypochlorous acid in the reaction. The cycle of operations may be represented as follows:

1. The reaction of hypochlorous acid with tertiary butyl alcohol to form tertiary butyl hypochlorite.

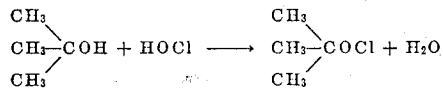

2. The reaction of tertiary butyl hypochlorite with an indene type hydrocarbon in the presence of a dilute organic acid to form the desired haloester.

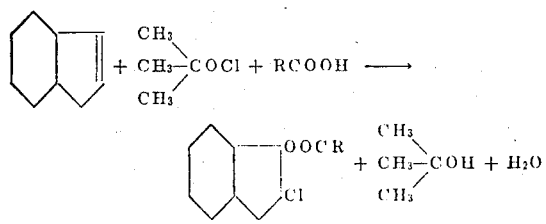

The use of tertiary butyl hypochlorite for the preparation of indene-type haloesters permits the use of solutions of hypochlorous acid of any desired concentration, as tertiary butyl hypochlorite is soluble in all proportions in the indene-type hydrocarbons. The reaction between hypochlorous acid, the desired indene-type hydrocarbon, and an organic acid therefore may be carried out in a homogeneous system, as the hypochlorous acid is generated at the same rate at which it reacts with the indene-type hydrocarbon. The production of undesirable chlorinated by-products, such as dichlorides and hydrochlorides, is correspondingly reduced.

This process of producing indene-type haloesters is illustrated by the following example.

*Example 1*

A 518 gram portion (7 mols) of tertiary butyl alcohol (M. P.=24° C.) was stirred with 2800 cc. of a 10% aqueous solution of sodium hydroxide at a temperature of −10° C. for a period of eight hours, a rapid stream of chlorine gas being passed into the mixture during this period. A total of 411 grams of chlorine (5.8 mols) was absorbed. The mixture was then permitted to stand for a short period of time, whereupon stratification occurred. The upper layer, which was a deep yellow oil, was separated from the lower aqueous layer and washed twice with cold water to remove any unreacted chlorine and tertiary butyl alcohol. The oily layer was then dried over anhydrous sodium sulfate and distilled at atmospheric pressure. A total of 510 grams of tertiary butyl hypochlorite, with a boiling point of 78° C., was obtained. The product was a pale yellow, mobile liquid with a characteristic pungent odor.

A mixture of 486.5 grams of an 86.5% indene fraction obtained by the fractionation of light oil from oil gas, and containing 3.62 mols of indene and 239 grams (3.98 mols) of glacial acetic acid was added to a three-neck flask provided with a reflux condenser and an agitator. To this mixture was added 392 grams (3.62 mols) of tertiary butyl hypochlorite with good agitation during the course of 2 hours at a temperature of 20–25° C. The mixture then was agitated for an additional period of 3 hours and permitted to stand overnight.

The product was extracted four times with cold water, once with an aqueous sodium bicarbonate solution, twice again with cold water, and dried over calcium chloride. The product weighed 755.6 grams.

Upon fractionation, a 60% yield of indene chloroacetate (otherwise identified as chloricindanyl acetate), based upon the indene present in the light oil fraction employed, was obtained. The product, which possessed a pleasant ester-like odor, had the following physical properties.

Boiling range=118–128° C. @ 5–6 mm.
Density ($d20/4$) =1.17–1.19
Refractive index ($n20/D$) =1.533–1.536

The saponification equivalent of the product was found to be 101, 105, which agrees well with the theoretical value of 105.3.

Upon hydrolyzing a portion of the product with dilute HCl indene chlorohydrine having a melting point of 124.5° C. was obtained, which agrees well with the melting point of 2-chloro-1-hydroxy hydrindene (126° C.).

By refluxing a second portion of the product with potassium acetate in glacial acetic acid, indene glycol diacetate was obtained. Upon refluxing this product with 30% KOH, trans indene glycol having a melting point of 156.5° C. was obtained. This agrees well with the value reported in the literature (159° C.).

Example 2

Indene was diluted with an equal volume of carbon tetrachloride, cooled to −10° C., and chlorine passed in until the calculated amount had been adsorbed. The product then was treated with an equal volume of water and the calculated amount of calcium carbonate. The mixture was heated until all of the carbon tetrachloride had been removed, after which it was refluxed for 15 hours. A small amount of acetic acid was added to remove traces of unreacted calcium carbonate and the solution permitted to cool. Water was removed by decantation and the product washed twice with hot water. The indene chlorohydrine obtained was dried, treated with the calculated amount of acetic anhydride, refluxed for 2 hours, and distilled. A 70% yield of indene chloroacetate boiling @ 130–145° C. @ 10 mm., absolute, was obtained. The product solidified to a white solid melting at 25–45° C.

Example 3

Indene dichloride was heated with a mixture of acetic acid and potassium acetate. A 50% yield of indene chloroacetate was obtained.

Monochlorourea

also reacts with indene-type hydrocarbons in the presence of an organic acid to form the corresponding haloester. A by-product of the reaction is urea, which may be separated from the reaction product and re-used in the process. This cycle of operations may be represented by the following series of equations.

1. The reaction of chlorine with urea to form monochlorourea.

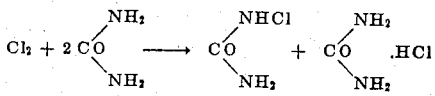

In order to obtain a product free from urea hydrochloride, the reaction may be carried out in the presence of certain materials which are capable of reacting with the hydrogen chloride liberated during the course of the reaction, such as calcium carbonate. This process is illustrated by the following equations

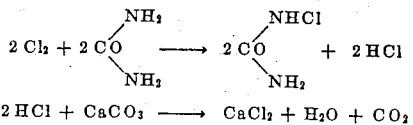

$2HCl + CaCO_3 \longrightarrow CaCl_2 + H_2O + CO_2$

2. The reaction of monochlorourea with an indene-type hydrocarbon in the presence of an organic acid to form the corresponding haloester.

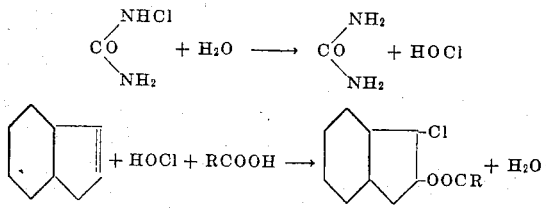

The reaction between monochlorourea and an indene-type hydrocarbon proceeds even in the absence of a catalyst. In the presence of a catalyst, however, the reaction proceeds to completion at a satisfactory rate, and good yields of the desired haloester may be readily obtained. It has been found that the organic acids used in the process, such as acetic acid, are satisfactory catalysts for this purpose, as they are soluble in all proportions in the reaction medium. In addition, certain other acidic substances, such as urea hydrochloride, have also been found to be effective catalysts. The use of urea hydrochloride as a catalyst is particularly desirable, as it is obtained as a by-product during the preparation of monochlorourea.

It has been found that the use of urea hydrochloride as a catalyst in concentrations greater than 10% is undesirable, as the hydrogen chloride liberated reacts with the hypochlorous acid, liberated by the monochlorourea present, to form nascent chlorine. The chlorine so generated reacts with a portion of the indene type hydrocarbon present to form the corresponding dichloride, thus contaminating the product.

By the use of monochlorourea for the preparation of indene-type haloesters, solutions of hypochlorous acid of any desired concentration may be obtained, as monochlorourea is soluble in all proportions in the said hydrocarbons. The process also has the advantage that the reaction between hypochlorous acid and the desired indene-type hydrocarbon can be carried out in a homogeneous solution, as the hypochlorous acid is generated at the same rate at which it reacts with the hydrocarbon.

Indene-type haloesters are, in general, practically colorless solids or fluids possessing very pleasant odors.

As pointed out previously, these haloesters are excellent plasticizers for resinous and plastic materials, including (1) cellulosic derivative plastics, such as cellulose esters and ethers, for example, cellulose acetate, cellulose nitrate, ethyl cellulose, benzyl cellulose, cellulose acetopropionate, cellulose acetobutyrate, and the like; (2) vinyl plastics, such as plastics derived from vinyl esters, for example, vinyl chloride, vinyl acetate, vinyl chloride-vinyl acetate mixtures, vinyl chloroacetate, vinyl propionate, and the like, and polyvinyl acetal, polyvinyl butyral, and similar plastics; (3) vinylidene plastics, such as polymerized vinylidene esters and derivatives, for example vinylidene chloride, vinylidene acetate, and the like; (4) styrene and substituted styrene polymers, such as polystyrene, polymethyl styrene, polystyrene-polymethyl styrene copolymers, and the like; (5) methacrylic plastics, such as polymers derived from methacrylic acid, esters and/or derivatives of methacrylic acid, for example methyl methacrylate, ethyl methacrylate, and the like, methacrylic nitrile, and similar compounds; (6) acrylic plastics, such as polymers derived from acrylic acid and/or esters or derivatives thereof, for example, methyl acrylate, ethyl acrylate, acrylic nitrile, and similar materials; (7) hydrocarbon resins such as isobutylene polymers, (8) miscellaneous plastics, such as polyvinyl alcohol, alkyd resins, ester gum, rosin ester, polyamid-polybasic acid plastic masses, and the like; and (9) natural resins, such as rosin, copal, kauri, dammar, pontianak, and elemi.

Copolymers prepared by the copolymerization of two or more of the monomeric compounds listed or indicated in the preceding paragraph also may be plasticized by haloesters of the type disclosed herein.

The properties of haloesters of indene-type hydrocarbons, and particularly chloroesters, which render them particularly desirable for use as plasticizing agents for resinous and plastic materials are (1) their unusually good solubility characteristics, rendering them compatible with a wide variety of resins and plastics, (2) their chemically inert nature, due to the unusually stable nature of the chlorine atom present, resulting in the production of very stable compositions, (3) their relatively high boiling point or ranges, retarding or preventing blushing, bleeding, blooming, and the like, and insuring against premature embrittlement due to loss of solvent, (4) their colorless and color-stable properties, enabling permanent light colored or colorless compositions to be formed at will, (5) the ease with which they may be incorporated in plastic compositions, and (6) their low viscosity characteristics.

Any desired quantity of haloesters of the type disclosed herein may be incorporated in such resinous or plastic compositions, or mixtures thereof, due care being taken not to exceed the compatibility limit of the desired haloesters if a clear plastic and/or coating composition or film is desired. In certain cases in which a translucent and/or opaque effect is desired, the compatibility limit of the haloester in the plastic, or mixture of plastics, may be exceeded with this end in view.

For most purposes, I find that 50%, or less, of a haloester of the type described herein is sufficient to impart the desired degree of plasticity to the resin and/or plastic, although this quantity may be exceeded in certain cases. Excellent results may be secured in many cases in which 30%, or even less, of the plasticizing agent is employed.

Haloesters of the type described herein also may be used in conjunction with other plasticizing agents, such as esters of phthalic acid, tetrahydrophthalic acid, 3-methyl-Δ4-tetrahydrophthalic acid, 4-methyl-Δ4-tetrahydrophthalic acid, 3,6-endomethylene-Δ4-tetrahydrophthalic acid, maleic acid, and the like; esters of sebacic acid such as dicapryl sebacate; esters of abietic acid, and rosin acid, as well as hydrogenated esters thereof; phosphoric acid esters, such as tricresyl phosphate; chlorinated diphenyls; and the like, in plasticizing resinous and/or plastic materials. In all such cases, I prefer to employ plasticizing compositions in which haloesters of the type described herein are the preponderating constituent, or constituents, present.

Other ingredients, including solvents, fillers, pigments, dyes, driers, and the like also may be incorporated in resin-plasticizer compositions of the type described, if desired.

Resin and/or plastic compositions of the type described may be used for many purposes, such as the preparation of molding powders for extruding rods, tubes, sheets, films, and the like; for the preparation of coating and/or impregnating compositions; for the preparation of aqueous emulsions; and the like.

Plasticizing agents of the type described herein may be incorporated in monomeric resin-forming materials prior to, or during, their polymerization or conversion to the resinous state, as they are completely inert in nature and do not affect the polymerization in any way. This is of very considerable practical importance as it permits the formulation of plasticized casting compositions, and/or insures a uniform distribution of the plasticizing agent throughout the resulting plastic.

Casting compositions may, of course, contain one or more monomeric polymerizable compounds, and such compound or mixture of compounds may be polymerized to any desired extent short of complete polymerization prior to casting.

Plasticizing agents of the type described herein may be incorporated after polymerization or conversion to the resinous state, if desired.

The use of haloesters of indene-type hydrocarbons plasticizing agents is illustrated by the following examples.

*Example 4*

A nitrocellulose lacquer having the following composition is prepared.

| | Parts |
|---|---|
| Ester gum | 5 |
| Indene chloroacetate | 5 |
| One half-second nitrocellulose | 10 |
| Thinner | 40 |

The thinner used may have the following composition:

| | Parts |
|---|---|
| Pentacetate | 20 |
| Tertiary amyl alcohol | 10 |
| Isopropyl acetate | 13 |
| Absolute ethyl alcohol | 3 |
| Toluene | 34 |
| Troluol | 20 |

The lacquer is clear and light amber in color. A portion of it, when flowed on the surface of a tin panel and permitted to dry for a period of 48 hours, will give a coating film possessing good properties.

*Example 5*

An ethyl cellulose lacquer is prepared according to the following formula.

| | Parts |
|---|---|
| Ethyl cellulose | 10 |
| Indene chloroacetate | 5 |
| Ester gum | 5 |
| Thinner | 80 |

The thinner use may have the following composition:

| | Parts |
|---|---|
| Isoproyl acetate | 15 |
| Absolute ethyl alcohol | 3 |
| Amyl acetate | 18 |
| Tertiary amyl alcohol | 10 |
| Toluene | 40 |
| Troluol | 14 |

The lacquer is clear and has a very light amber color. When brushed on the surface of a tin panel and permitted to dry for a period of 48 hours, a clear, adherent coating film is obtained.

Indene type haloesters are particularly well adapted for use as addition agents for soap and similar detergent materials. When added to soap or similar products, such as synthetic detergents and the like, they serve not only to impart desirable odors thereto, but also assist in sealing the pores of such materials to prevent efflorescence and deterioration.

A preferred embodiment of this invention is the use of haloesters of the type described in conjunction with one or more compounds selected from a group including phenyl ethyl alcohol, esters of phenyl ethyl alcohol, methyl phenyl carbinol, esters of methyl phenyl carbinol, alkyl phenyl ethyl alcohols, and esters of alkyl phenyl ethyl alcohols.

The addition of one or more haloesters of the type described to bar soap and other soap and/or synthetic detergent products as an odorant and/or sealing agent is particularly advantageous due to the unusually stable nature of these materials. They may be incorporated in soap in any desired manner and any desired proportion may be employed. Quantities in the range of 0.05% to 5% by weight may be regarded as typical.

Thus, for example, a mixture of 98 parts by weight of dried weighed soap chips and 2 parts by weight of indene chloroacetate may be thoroughly mixed and fed into a milling machine. The milled soap then may be plodded, stamped, molded, and/or otherwise processed. The bar soap thus obtained will be found to possess a very agreeable odor and to be quite resistant to efflorescence.

In addition to their use in bar soap, haloesters of the type described also may be employed to advantage in other types of soap, such as, for example, flake, chip, powder, or bead forms. In addition, they may be incorporated in synthetic detergents, such as sodium lauryl sulfonate and alkyl benzene sulfonate sodium salt.

The soaps and synthetic detergents to which this invention relates may be classified conveniently under the generic term "detergents." Generally speaking, detergent compounds contain more than 15 carbon atoms. Thus, soaps used as detergents are, generally speaking, alkali metal salts of fatty acids containing more than 15 carbon atoms, examples of which are the sodium and potassium salts of palmitic, oleic, and stearic acids.

Haloesters of indene-type hydrocarbons also are excellent plasticizing agents for natural, and particularly for synthetic, rubber or elastomers.

Examples of the rubber of rubber-like materials with which haloesters of the type described herein may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, buna, Buna S, Buna N, Perbunan, chloroprene, neoprene, Ameripol, Hycar, butyl rubber, and the like.

Synthetic rubbers of the type obtained by the reaction of dihalides with organic or inorganic sulfides or polysulfides also are included, such as, for example, the material prepared by the reaction of ethylene dichloride with sodium tetrasulfide and sold under the trade name, Thiokol.

The quantity of haloester of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

I prefer to use from 2% to 30%, by weight, and more particularly from 4% to 10%, by weight, of such haloester, based on the weight of the rubber.

In addition to haloesters of the type described herein, other ingredients which may be incorporated in natural rubber and/or synthetic rubber compositions include vulcanizing agents and/or accelerators, such as, for example, sulfur or sulfur-containing compounds such as tetramethylthiuram disulfide, mercaptoarylenethiazoles, such as mercaptobenzothiazole, benzothiazyl disulfide, litharge, and dithio carbamates; pigments, such as, for example, magnesium oxide, zinc oxide, and lead oxide; antioxidants, such as, for example, phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutylphthalate, tricresyl phosphate, pine oil, oils, fatty acids, and synthetic or natural resins or resinous materials.

A preferred embodiment of the invention is the use of haloesters of the type described in conjunction with resins, such as those derived by the polymerization of light oil and/or coal tar fractions containing cumarone and/or indene or the resins derived by the polymerization of the high-boiling monomeric material derived from tar by flash distillation and/or solvent extraction processes, and/or other organic liquids, such as the high boiling aromatic oils derived by the flash distillation and/or solvent extraction of tar, as softening agents for natural and/or synthetic rubber.

Another preferred embodiment of this invention is the use of haloesters of the type described in combination with one or more resinous materials as a softener for natural and/or synthetic rubber compositions. A preferred resin for incorporating with the haloester is the resin obtained by the polymerization, by thermal and/or catalytic methods, of certain high boiling monomeric material separated in monomeric form from tar formed during the production of combustible gas by processes involving the pyrolytic decomposition of petroleum oil with or without the aid of catalysts. As pointed out previously, such resins may be formed in situ in aromatic oils of similar type.

Another desired resin which may be incorporated in the haloesters as softeners for natural and/or synthetic rubber is the resin derived by the polymerization of petroleum and/or coal tar fractions containing indene and/or cumarone.

Other desirable ingredients which may be blended with a haloester of the type described either alone or in combination with one or more resinous materials, as a softener for natural and/or synthetic rubber include the dimers of petroleum or coal tar fractions containing indene and/or cumarone, dibutyl phthalate, tricresyl phosphate, and pine oil.

Reclaimed rubber is also included among the materials which may be plasticized with the haloesters herein described, together with natural and/or synthetic rubber, and with or without other ingredients.

The haloesters and other ingredients, may be mixed or compounded with the natural rubber and/or synthetic rubber on mixing or compounding rolls or mills, or they may be compounded by any other method known in the art. The rubber composition then may be vulcanized, if desired, by any of the methods employed for this purpose in the art.

Examples of rubber compositions containing haloesters of the type described herein are as follows.

*Example 6*

| Component: | Parts by weight |
|---|---|
| Natural rubber | 100 |
| Indene chloroacetate | 10 |
| Zinc oxide | 5 |
| Sulfur | 2.5 |
| Mercaptobenzothiazole | 0.8 |

*Example 7*

| Component: | Parts by weight |
|---|---|
| Pale crepe rubber | 100 |
| Zinc oxide | 45 |
| Sulfur | 2.5 |
| Resin obtained from monomeric material boiling above 210° C. and isolated from petroleum tar | 5 |
| Indene chloroacetate | 5 |
| Mercaptobenzothiazole | 0.6 |
| Stearic acid | 2 |

*Example 8*

A natural rubber tire tread mix may be compounded as follows:

| Component: | Parts by weight |
|---|---|
| Smoked sheet rubber | 100 |
| Channel black | 40 |
| Zinc oxide | 6 |
| Indene chloroacetate | 2 |
| Resin obtained from monomeric material boiling above 210° C. and isolated from petroleum tar | 2 |
| Sulfur | 3 |
| Stearic acid | 2 |
| Mercaptobenzothiazole | 0.7 |

*Example 9*

A synthetic rubber tire tread mix may be compounded as follows:

| Component: | Parts by weight |
|---|---|
| Neoprene | 100 |
| Zinc oxide | 5 |
| Mercaptobenzothiazole | 1.25 |
| Channel black | 45 |
| Indene chloroacetate | 4 |
| Phenyl-α-naphthylamine | 2 |
| Sulfur | 1.25 |

*Example 10*

| Component: | Parts by weight |
|---|---|
| Buna S | 80 |
| Plantation crepe | 20 |
| Zinc oxide | 5 |
| Channel black | 50 |
| Age Rite Resin D | 2 |
| Pine tar | 4 |
| Indene chloroacetate | 3 |
| Stearic acid | 2 |
| Sulfur | 1.5 |
| Altax | 2 |

*Example 11*

| Component: | Parts by weight |
|---|---|
| Butadiene-styrene rubber | 100 |
| Indene chloroacetate | 3 |
| Resin obtained from monomeric material boiling above 210° C. and isolated from petroleum tar | 3 |
| Carbon black | 40 |
| Sulfur | 1.25 |
| Mercaptobenzothiazole | 1.25 |
| Zinc oxide | 5 |
| Phenyl-α-naphthylamine | 1 |

*Example 12*

| Component: | Parts by weight |
|---|---|
| Butadiene-acrylic nitrile rubber | 100 |
| Indene chloroacetate | 2 |
| Resin obtained from monomeric material boiling above 210° C. and isolated from petroleum tar | 3 |
| Carbon black | 30 |
| Sulfur | 1.5 |
| Mercaptobenzothiazole | 1.5 |
| Zinc oxide | 15 |
| Phenyl-α-naphthylamine | 2 |

*Example 13*

| Component: | Parts by weight |
|---|---|
| Butadiene-isobutylene rubber | 100 |
| Indene chloroacetate | 5 |
| Resin obtained from monomeric material boiling above 210° C. and isolated from petroleum tar | 5 |
| Carbon black | 15 |
| Sulfur | 1.25 |
| Mercaptobenzothiazole | 1.25 |
| Phenyl-α-naphthylamine | 1 |
| Zinc oxide | 20 |

*Example 14*

| Component: | Parts by weight |
|---|---|
| Perbunan | 100 |
| Zinc oxide | 5 |
| Benzothiazyl disulfide | 1.5 |
| Sulfur | 1.5 |
| Phenyl-β-naphthylamine | 1 |
| Channel black | 50 |
| Stearic acid | 1 |
| Indene chloroacetate | 50 |

The foregoing compositions may be sheeted out, shaped and vulcanized, if desired, such as by the application of a temperature of, say, 140° C. in a press for a period of, say, 45 minutes. Other procedures may, of course, be used if desired.

Rubber haloester compositions of the type described, either as such or with the incorporation of other ingredients such as the resin and/or aromatic derived from monomeric material boiling above 210° C. and isolated from petroleum tar, may be used for a variety of purposes, such as for the manufacture of tires, tubes, and other objects, and as adhesives, coating, impregnating, and waterproofing agents. Such compositions may or may not be vulcanized prior to, during, or subsequent to the use thereof.

To summarize, the invention may be said to reside more completely in the preparation of haloesters of indene type hydrocarbons and in the utilization of such products as plasticizing agents for natural and/or synthetic resins, plastics, rubbers, elastomers, and/or elastics.

Rubber has been defined in the prior art as follows:

A. "An organic material which shows a high elasticity of 100 percent or more at room temperature and which does not lose this property upon storage at room temperature for considerable periods."

B. "A rubber is a substance which shows an elasticity of 800% or more with a quick return (snap) at temperatures at which natural rubber shows the same effect and which does not lose this property upon storage any sooner than does natural rubber."

C. "In order to qualify as a rubber, a material should stretch readily to a considerable degree and after release retract forcefully and quickly."

I prefer the following definition.

"The term rubber is intended to embrace elastomers, whether natural or synthetic, and whether or not admixed with other ingredients such as pigments, softening agents, etc. in the vulcanized or unvulcanized state, the said elastomer being (1) capable of vulcanization such as by the application of heat when in admixture with sulfur or other vulcanizing agent, or otherwise, (2) slightly soluble or substantially insoluble in bodied drying oils such as bodied linseed oil, and (3) capable, either in the unvulcanized state or at some stage in the vulcanization thereof, of being stretched readily to a considerable degree and, after release of the applied stress, retracting forcefully and quickly."

While I have more particularly described the use of indene chloroacetate by way of example in illustrating my invention as pertaining to the preparation of indene-type haloesters generally, it will be appreciated that the corresponding halopropionate, halobutyrate, halovalerate, etc., of indene type hydrocarbons may likewise be used for this purpose with equally good results.

It will be further understood that the foregoing is by way of illustration and that changes, omissions, additions, substitutions, and/or modifications might be made within the scope of the claims without departing from the spirit of the invention.

I claim:

1. A plasticized composition comprising a plasticizable organic substance and as a plasticizer therefor a carboxylic acid ester of a compound selected from the group consisting of indene halohydrines and alkyl indene halohydrines.

2. A plasticized composition comprising a plasticizable organic substance and as a plasticizer therefor a fatty acid ester of an alkyl indene halohydrine.

3. A plasticized composition comprising a plasticizable organic substance and as a plasticizer therefor a fatty acid ester of an indene halohydrine.

4. A plasticized composition comprising a plasticizable organic substance and as a plasticizer therefor a fatty acid ester of a methyl indene halohydrine.

5. A plasticized composition comprising a plasticizable organic substance and as a plasticizer therefor chloro-indanyl acetate.

6. As a new composition of matter, a cellulose ester plasticized by means of a fatty acid ester of indene chlorohydrine.

7. As a new composition of matter, a cellulose ether plasticized by means of a fatty acid ester of indene chlorohydrine.

8. As a new composition of matter, ethyl cellulose plasticized by means of a fatty acid ester of indene chlorohydrine.

9. As a new composition of matter, cellulose acetate plasticized by means of a fatty acid ester of indene chlorohydrine.

10. As a new composition of matter, nitrocellulose plasticized by means of a fatty acid ester of indene chlorohydrine.

FRANK J. SODAY.